United States Patent
Wybenga et al.

(10) Patent No.: US 6,948,040 B2
(45) Date of Patent: Sep. 20, 2005

(54) SYSTEM AND METHOD FOR SYNCHRONIZING A PLURALITY OF PROCESSORS IN A PROCESSOR ARRAY

(75) Inventors: Jack C. Wybenga, Plano, TX (US); Joseph Parchersky, Trophy Club, TX (US); Steven E. Tharp, Garland, TX (US)

(73) Assignee: Samsung Electronics Co., Ltd., Suwon (KR)

( * ) Notice: Subject to any disclaimer, the term of this patent is extended or adjusted under 35 U.S.C. 154(b) by 218 days.

(21) Appl. No.: 10/147,832

(22) Filed: May 17, 2002

(65) Prior Publication Data

US 2003/0217242 A1 Nov. 20, 2003

(51) Int. Cl.[7] .............................................. G06F 12/00
(52) U.S. Cl. ..................... 711/163; 711/151; 711/153
(58) Field of Search ................................ 711/151, 153, 711/163, 156

(56) References Cited

U.S. PATENT DOCUMENTS

| | | | | |
|---|---|---|---|---|
| 4,390,969 A | * | 6/1983 | Hayes | 375/359 |
| 5,963,056 A | * | 10/1999 | Narayana et al. | 326/96 |
| 6,678,801 B1 | * | 1/2004 | Greim et al. | 711/148 |

OTHER PUBLICATIONS

CPH (Paul) Walker, Hardware Implications of Virtual Channels, particularly for the Bus Interface, 1994, IOS Press, pp. 1–13.*
Sit et al. A Four–Phase Handshaking Asynchronous Static RAM Design for Self–Timed Systems, 1999, IEEE, pp. 90–96.*
Nishimura, Asynchronous Shared Memory Parallel Computation, 1990, ACM, pp. 76–84.*
Murata et al. Ultrafast Photonic Label Switch for Asynchronous Packets of Variable Length, 2002, IEEE.*

* cited by examiner

*Primary Examiner*—Mano Padmanabhan
*Assistant Examiner*—Mehdi Namazi (57) ABSTRACT

A system and method is disclosed for synchronizing a plurality of processors in a processor array. The system and method synchronizes data communications between the processors by regulating memory access of the processors to memory bytes of an asynchronous variable memory. Each memory byte in the asynchronous variable memory is a "read full and write empty" memory byte. Except for a system processor, each processor in the process array can only write data to an empty memory byte and can only read data from a full memory byte. The processors are prevented from untimely overwriting data and from untimely reading data. This keeps the data communications between the processors properly synchronized.

23 Claims, 5 Drawing Sheets

SYSTEM AND METHOD FOR SYNCHRONIZING A PLURALITY OF PROCESSORS IN A PROCESSOR ARRAY

TECHNICAL FIELD OF THE INVENTION

The present invention is directed, in general, to the interaction of multiple processors in a processor array, and, more specifically, to a system and method for synchronizing the operation of a plurality of processors within a processor array.

BACKGROUND OF THE INVENTION

The explosive growth of Internet traffic has been caused by the increased number of Internet users, various service demands from those users, the implementation of new services, such as voice-over-IP (VoIP) or streaming applications, and the development of mobile Internet. Conventional routers, which act as relaying nodes connected to subnetworks or other routers, have accomplished their roles well, in situations in which the time required to process packets, determine their destinations, and forward the packets to the destinations is usually smaller than the transmission time on network paths. More recently, however, the packet transmission capabilities of high-bandwidth network paths and the increases in Internet traffic have combined to outpace the processing capacities of conventional routers. Thus, routers are increasingly blamed for major bottlenecks in the Internet.

Early routers were implemented on a computer host so that the CPU of the host performed all managerial tasks, such as packet forwarding via a shared bus and routing table computation. This plain architecture proved to be inefficient, due to the concentrated overhead of the CPU and the existence of congestion on the bus. As a result, router vendors developed distributed router architectures that provide efficient packet processing compared to a centralized architecture. In a distributed router architecture, many of the functions previously performed by the centralized CPU are distributed to the line cards and the shared bus is replaced by a high-speed crossbar switch.

Figure 1:
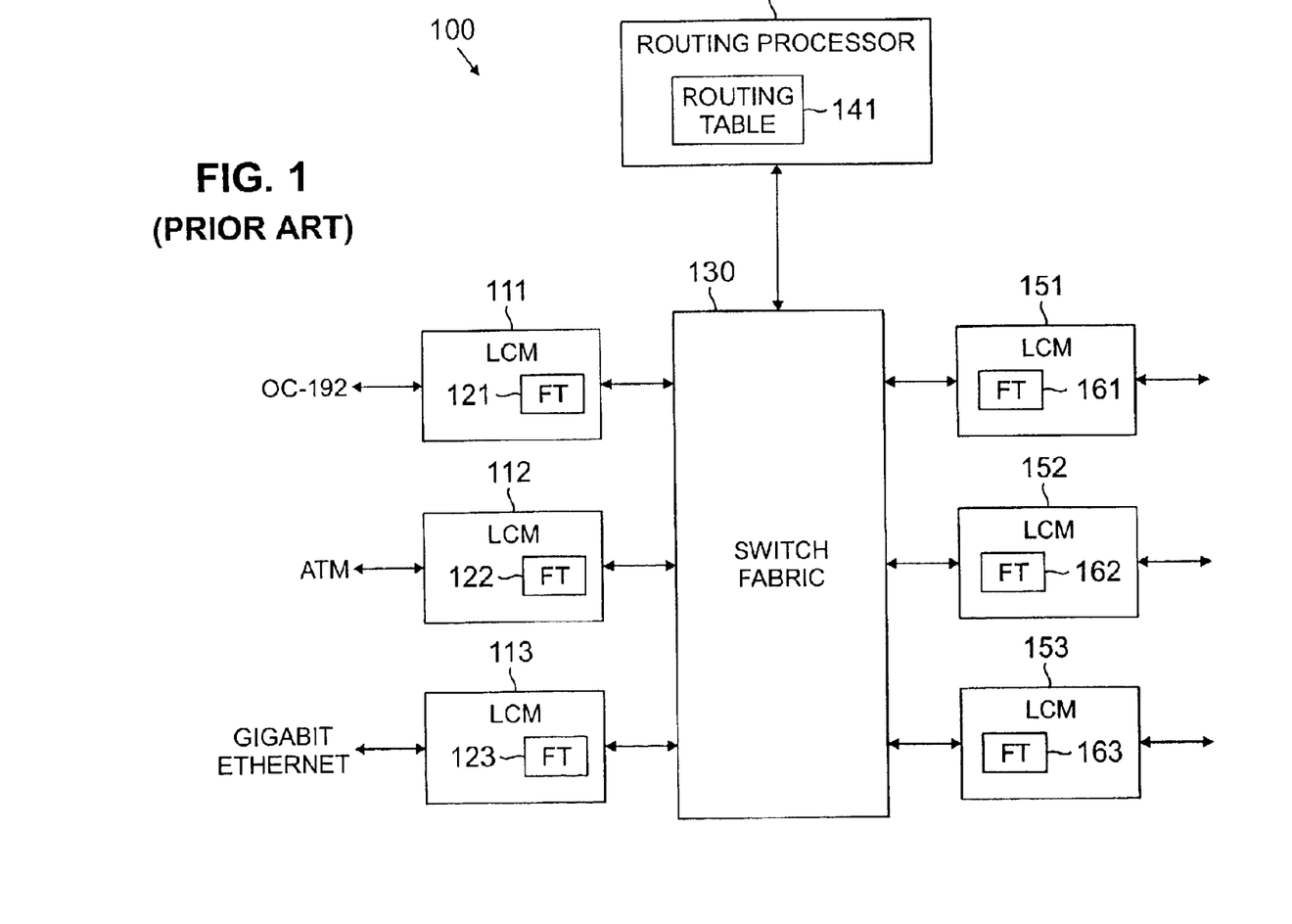
FIG. 1 illustrates a distributed router architecture according to an exemplary embodiment of the prior art.

FIG. 1 illustrates distributed router 100 according to an exemplary embodiment of the prior art. Distributed router 100 interfaces with different types of networks, including optical networks (OC-192), asynchronous transfer mode (ATM) networks, and Gigabit Ethernet, among others. Distributed router 100 comprises line card modules (LCMS) 111–113, switch fabric 130, routing processor 140, and line card modules (LCMS) 151–153. LCM 111, LCM 112, and LCM 113 contain forwarding table (FT) 121, forwarding table (FT) 122, and forwarding table (FT) 123, respectively. Similarly, LCM 151, LCM 152, and LCM 153 contain forwarding table (FT) 161, forwarding table (FT) 162, and forwarding table (FT) 163, respectively.

Packets coming from adjacent router(s) or subnetworks are received by line card modules 111–113 and line card modules 151–153 and sent to switch fabric 130. Switch fabric 130 switches packets coming from or going to line card modules 111–113 and 151–153 and plays an essential role in relaying packets.

Routing processor 140 builds routing table 141 and maintains the current status of routing table 141 by updating changed routes immediately. Routing processor 140 maintains routing table 141 by running a routing protocol, such as Routing Information Protocol (RIP), Open Shortest Path First (OSPF), or Border Gateway Protocol (BGP). Forwarding tables 121–123 and forwarding tables 161–163 support an efficient lookup in each line card and are downloaded from routing table 141 of routing processor 140. If an incoming packet from a line card module cannot find its destination path from the forwarding table, the corresponding packet may be passed through switch fabric 130 toward a pre-defined default route, or may be silently discarded at the line card.

The main reason for router manufacturers to favor distributed architecture is the simplicity of using a centralized processor to manage one routing table in a consistent way. On the other hand, although the separation of routing and forwarding functions enables high-speed packet processing, the introduction of QoS-capable routing service and the route delays caused by network instability demand even greater packet processing capacity, thereby resulting in additional overhead for the routing processor or instability in the router itself.

A large number of small routers can operate in concert (i.e., in parallel) if an efficient set of interoperability rules is established. The industry has avoided this coordination problem by using a single routing server to handle the routing problems. Therefore, it bounds both the scale of the router and its maximum performance to the scale of available microprocessor processing capacity. Another approach to the problem uses a massively parallel router has a distributed architecture that implements an efficient packet routing protocol without bounding the router and its maximum performance to the scale of available microprocessor processing capacity.

A massively parallel router comprises a plurality of input-output processor units. An input-output processor unit is an example of a device that comprises a plurality of individual processors coupled together in a processor array. In order to efficiently operate an input-output processor unit it is necessary to synchronize the operation of each of the individual processors within the processor array.

Prior art methods of synchronizing operations between individual processors in processor array typically have involved the steps of exchanging state information and utilizing specialized multiprocessor locking mechanisms. A major disadvantage of the prior art techniques is the complications that are introduced into the operation software.

Therefore, there is a need in the art for an improved system and method for synchronizing the operation of a plurality of processors within a processor array. In particular, there is a need in the art for an improved system and method for synchronizing the operation of a plurality of processors within an input-output processor unit of a parallel router system.

SUMMARY OF THE INVENTION

It is an object of the present invention to provide a system and method for synchronizing a plurality of processors in a processor array.

The system and method of the present invention synchronizes data communications between the processors in the processor array by regulating memory access of the processors to memory bytes of an asynchronous variable memory. Each memory byte in the asynchronous variable memory is a "read full and write empty" memory byte. Except for a system processor, each processor in the process array can only write data to an empty memory byte and can only read data from a full memory byte. The "read full and write empty" memory bytes of the asynchronous variable memory prevent the processors from untimely overwriting data and from untimely reading data. This keeps the data communications between the processors in the processor array properly synchronized.

It is an object of the present invention to provide a system and method for synchronizing data communications between processors in a processor array using an asynchronous variable memory that is accessible by each processor in the processor array.

It is also an object of the present invention to provide a system and method for synchronizing data communications between processors in a processor array using an asynchronous variable memory comprising "read full and write empty" memory bytes.

It is another object of the present invention to provide two descriptor bits in an asynchronous variable memory byte that signify a status of the asynchronous variable memory byte.

It is yet another object of the present invention to provide a plurality of "read full and write empty" memory bytes in an asynchronous variable memory in which each memory byte is capable of allowing a processor to write data only to an empty memory byte and is capable of allowing a processor to read data only from a full memory byte.

It is an additional object of the present invention to provide a system processor in the processor array that is capable of accessing each of the asynchronous variable memory bytes in the asynchronous variable memory without memory access regulation.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior uses, as well as to future uses, of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 6, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged processor array.

Figure 2:
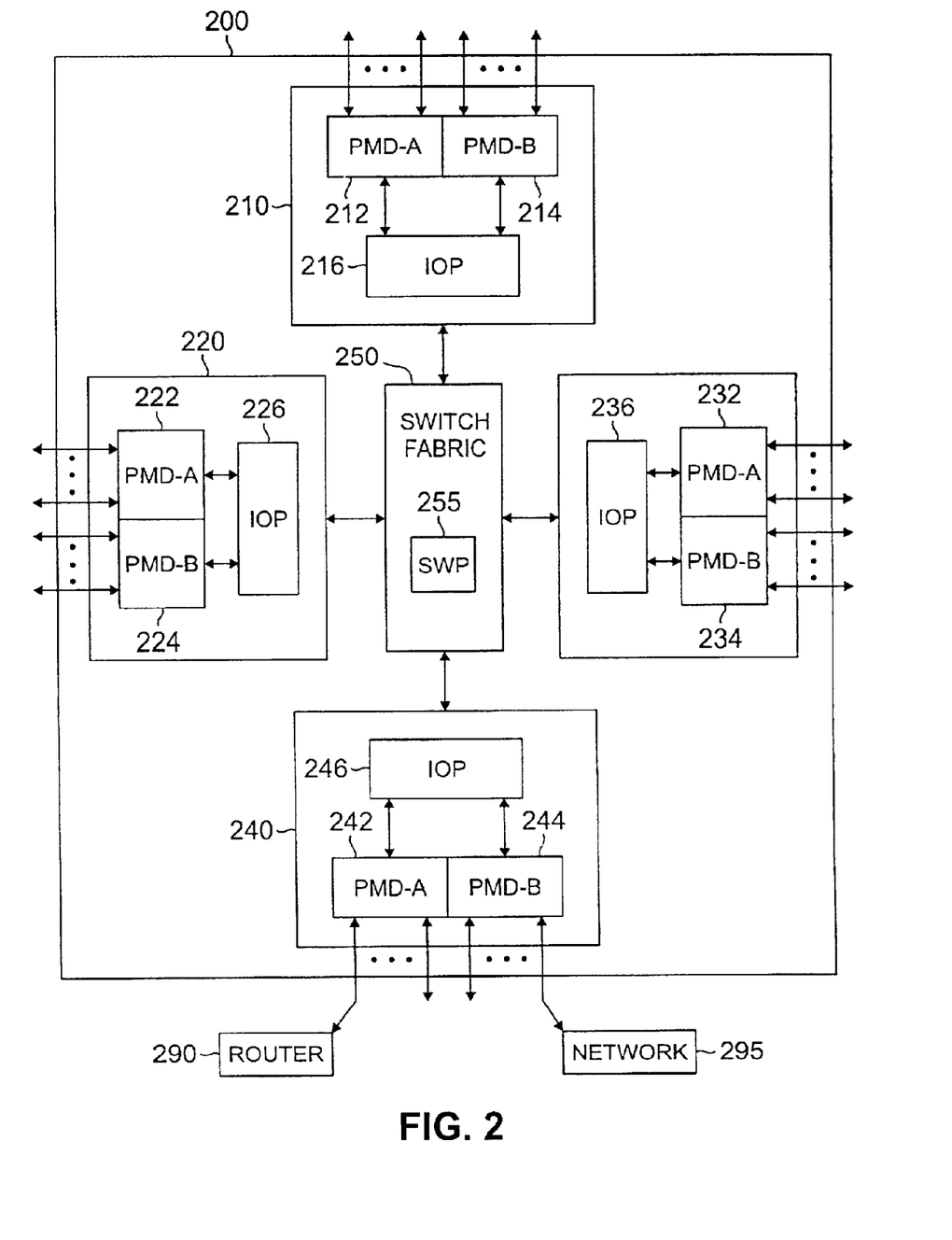
FIG. 2 illustrates a distributed router architecture that comprises a plurality of input-output processor units each of which is capable of synchronizing a plurality of individual processors within the input-output processor unit according to an advantageous embodiment of the present invention.

FIG. 2 illustrates a distributed router architecture 200 that uses a plurality of input-output processor units each of which synchronizes the operation of a plurality of individual processors in a processor array according to the principles of the present invention. Distributed router architecture 200 provides scalability and high performance using up to N independent routing nodes (RN), including exemplary routing nodes 210, 220, 230 and 240, connected by high speed switch fabric 250. Each routing node comprises an input output processor unit (IOP), and one or more physical medium devices (PMDs). Exemplary RN 210 comprises PMD 212 (labeled PMD-A), PMD 214 (labeled PMD-B), and IOP 216. RN 220 comprises PMD 222 (labeled PMD-A), PMD 224 (labeled PMD-B), and IOP 226. RN 230 comprises PMD 232 (labeled PMD-A), PMD 234 (labeled PMD-B), and IOP 236. Finally, exemplary RN 240 comprises PMD 242 (labeled PMD-A), PMD 244 (labeled PMD-B), and IOP 246.

Each one of IOP 216, IOP 226, IOP 236, and IOP 246 buffers incoming Internet protocol (IP) packets from subnets or adjacent routers, such as router 290 and network 295. Each one of IOP 216, IOP 226, IOP 236, and IOP 246 also classifies requested services, looks up destination addresses from packet headers, and forwards packet to the outbound IOP. Moreover, each IOP also maintains an internal routing table determined from routing protocol packets and computes the shortest data paths from the routing table. Each IOP processes an incoming packet from one of its PMD modules. According to one embodiment of the present invention, each PMD card frames an incoming packet (or cell) from an IP network (or ATM switch) to be processed in an IOP and performs bus conversion functions.

Each one of routing nodes 210, 220, 230, and 240, configured with an IOP and PMD(s) and linked by switch fabric 250, is essentially equivalent to a router by itself. Distributed router architecture 200 comprises a generic and scalable router architecture that uses multiple routing nodes (RNs) connected by high-speed switch fabric 250. Therefore, distributed router architecture 200 can be considered a set of routing node (RN) building blocks with high speed links connected to each block. Switch processor (SWP) 255 located in switch fabric 250 supports system management as well as packet switching between input-output processor units (IOPs). Distributed router architecture 200 can be constructed by using available off-the-shelf commodities on the market, thereby resulting in cost competitiveness, flexibility, resiliency, and scalability by attaching each building block to the switch fabric.

Figure 3:
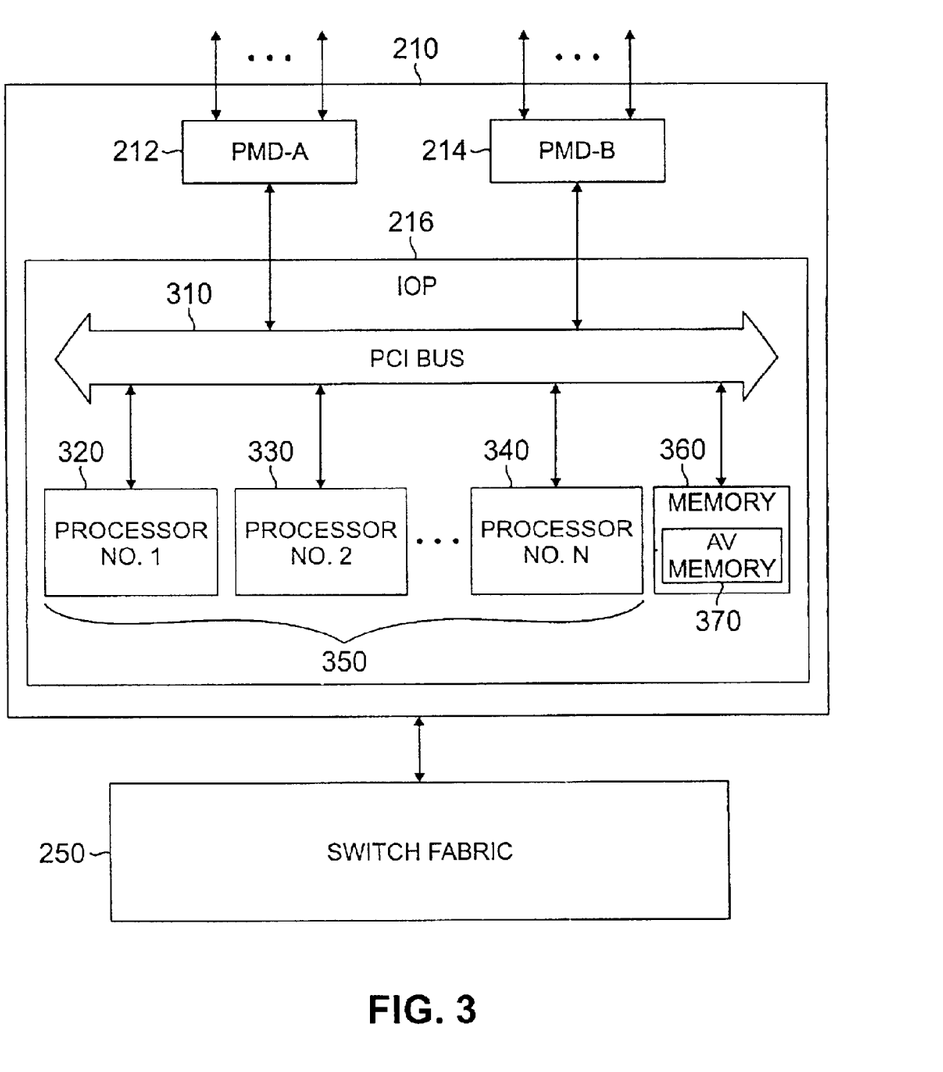
FIG. 3 illustrates a block diagram showing a more detailed view of a routing node and an input-output processor unit that comprises a plurality of individual processors synchronized using an advantageous embodiment of the present invention.

FIG. 3 illustrates a block diagram showing a detailed view of routing node 210 and input-output processor unit (IOP) 216 that comprises a plurality of individual processors (320, 330, . . . , 340) that are synchronized according to the principles of the present invention. As shown in FIG. 3, bus 310 (e.g., a PCI bus 310) is coupled to each processor in IOP 216. Each processor in IOP 216 is capable of communicating with all of the other processors in IOP 216 that are coupled to PCI bus 310. The processors (320, 330, . . . , 340) in IOP 216 are collectively referred to as processor array 350.

PCI bus 310 is also coupled to PMD-A 212 and to PMD-B 214. PMD-A 212 and PMD-B 214 are each capable of sending data to and receiving data from devices coupled to PCI bus 310. It is understood that PMD-A 212 and PMD-214 are representative and that there may be more than two PMD devices coupled to PCI bus 310.

PCI bus 310 is also coupled to a memory unit 360 in IOP 216. Each processor (320, 330, . . . , 340) in IOP 216 that is coupled to PCI bus 310 and each PMD unit that is coupled to PCI bus 310 is capable of communicating with memory unit 360. Memory unit 360 comprises a portion of memory 370 that operates in response to an input value of an asynchronous variable. Memory 370 is referred to as "asynchronous variable" memory 370 or simply "AV" memory 370.

In one advantageous embodiment of the present invention, memory 370 comprises a one kilobyte (1 kb) block of memory. Memory 370 comprises conventional memory bytes for storing data. Memory 370 also comprises two (2) descriptor bits associated with each memory byte for storing data. The two (2) descriptor bits signify the status of each memory byte.

Figure 4:
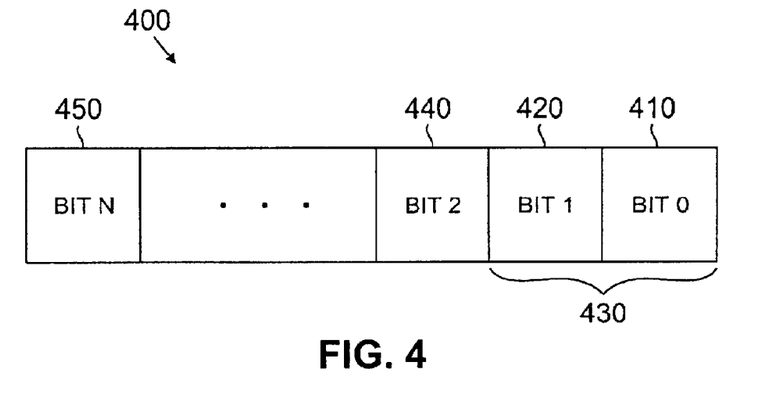
FIG. 4 illustrates an exemplary byte of an asynchronous variable memory of the present invention.

FIG. 4 illustrates an exemplary individual byte of memory 400 within "asynchronous variable" memory 370. The two (2) descriptor bits are "Bit 0" 410 and "Bit 1" 420. The two (2) descriptor bits are collectively referred to with reference numeral 430. The remaining bits of byte 400 (i.e., "Bit 2" 440 through "Bit N" 450) contain the data stored in the memory byte. A bit setting of "zero zero" (i.e., Bit 0 and Bit 1 are both equal to "0") in the two descriptor bits 430 for byte 400 in memory 370 signifies that the byte has not been initialized. A byte that has not been initialized can only be accessed by a "system" processor that is specifically authorized to write data into an uninitialized byte.

A "system" processor is one of the processors in IOP 216 that has been selected to have a privileged status of being a FPGA (Field Programmable Gate Array) processor. For purposes of explanation, assume that the "system" processor in IOP 216 is processor 320. The "system" processor 320 can treat each byte in memory 360 (including bytes in memory 370) as an ordinary memory byte. That is, the "system" processor 320 can read data from or write data into each memory byte in memory 370 without restriction. The other processors in IOP 216 do not the capability of "system" processor 320 with respect to memory 370.

A bit setting of "zero one" (i.e., Bit 0 equal to "1" and Bit 1 equal to "0") in the two descriptor bits 430 for byte 400 signifies that the byte is empty. Any processor in IOP 216 can write data into an empty byte in memory 370.

A bit setting of "one zero" (i.e., Bit 0 equal to "0" and Bit 1 equal to "1") in the two descriptor bits 430 for byte 400 signifies that the byte is full. Any processor in IOP 216 can read data from a full byte in memory 370.

A bit setting of "one one" (i.e., Bit 0 equal to "1" and Bit 1 equal to "1") in the two descriptor bits 430 for byte 400 signifies that the byte is locked. A locked byte is not accessible except to the "system" processor 320. The other processors in IOP 216 cannot access a locked byte that has a "one one" bit setting.

The bit settings for the two descriptor bits ("Bit 1, Bit 0") for each byte may be summarized as follows:

| Bit Setting | Byte Status |
| --- | --- |
| "00" | Uninitialized Byte |
| "01" | Byte Empty |
| "10" | Byte Full |
| "11" | Byte Locked |

Each processor (320, 330, . . . 340) in IOP 216 can write data into an empty byte in memory 370 and can read data from a full byte in memory 370. As previously mentioned, the "system" processor 320 can treat each byte of data in memory 370 as an ordinary memory byte (including uninitialized bytes and locked bytes). The "system" processor 320 initializes an uninitialized byte by writing data into the byte.

A processor in IOP 216 that writes data into memory 370 is referred to as a "producer" of the data that is written. A processor in IOP 216 that reads data out of memory 370 is referred to as a "consumer" of the data that is read. Each processor in IOP 216 is capable of sending data to and receiving data from each of the other processors in IOP 216.

Each processor in processor array 350 communicates with each of the other processors in processor array 350 by sending and receiving data. The system and method of the present invention synchronizes the operation of the plurality of processors in processor array 350 using the "asynchronous variable" memory 370. As will be more fully described, memory 370 regulates access to the data in each memory byte 400 of memory 370. The regulation of access provided by the present invention ensures that data is not accessed out of its proper time sequence. Except for the "system" processor, memory 370 will deny each processor in processor array 350 the ability to read of data out of memory 370 (or to write data into memory 370) whenever the memory access would cause the operation of the processors to become unsynchronized.

To accomplish this, memory 370 uses memory bytes that are "read full" and "write empty" bytes. If a memory byte 400 of memory 370 is empty, that byte cannot be read. That is the meaning of the term "read full." When data is read out of a "read full" byte, the byte becomes empty. If a memory byte 400 of memory 370 is full, that byte cannot be written into (which would overwrite the data that was previously in the byte). That is the meaning of the term "write empty." When data is written into a "write empty" byte, the byte becomes full.

The purpose of the two (2) descriptor bits 430 for each byte 400 of memory 370 is to defer memory access to the bytes if the "read full" or "write empty" criterion of the asynchronous variable is not met.

When a processor in processor array 350 writes data into an empty memory byte 400 in memory 370, the processor writes the data into the byte 400 and then sets the two (2) descriptor bits 430 to "10" signifying the "Byte Full" condition. When a processor in processor array 350 reads data from a full memory byte 400 in memory 370, the processor reads the data and then sets the two (2) descriptor bits 430 to "01" signifying the "Byte Empty" condition.

If a processor in processor array 350 attempts to write data into a full byte 400 in memory 370, the attempt will be aborted because the byte is full. The processor may make another attempt at a later time. The later attempt will be successful if the byte has become empty by the time the later attempt is made.

If a processor in processor array 350 attempts to read data from an empty byte 400 in memory 370, the attempt will be aborted because the byte is empty. The processor may make another attempt at a later time. The later attempt will be successful if the byte has become full by the time the later attempt is made.

In this manner, the access of each processor in processor array 350 (except the "system" processor) is restricted so that each memory access (either for reading or for writing) occurs in its proper sequence. The non-"system" processors in processor array 350 are therefore prevented from untimely overwriting data and from untimely reading data. This keeps the processors in processor array 350 operating in a synchronized manner.

Figure 5:
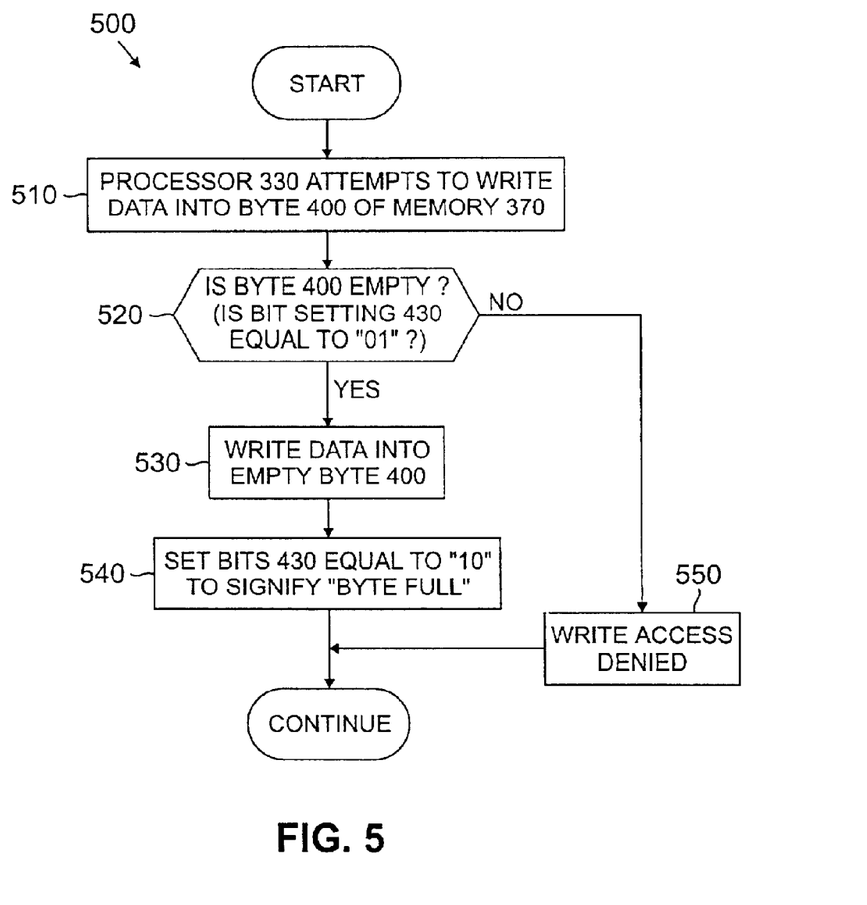
FIG. 5 illustrates a flow chart illustrating the operation of an advantageous embodiment of a method of the present invention for synchronizing the operation of individual processors in a processor array with respect to a write operation.

FIG. 5 illustrates a flow chart illustrating the operation of an advantageous embodiment of a method of the present invention for synchronizing the operation of individual processors in a processor array with respect to a write operation. The steps of the method are collectively referred to with reference numeral 500.

Processor 330 is a non-"system" processor. Processor 330 attempts to write data into byte 400 of memory 370 (step 510). Processor 330 checks the two descriptor bits 430 to determine if byte 400 is empty (decision step 520). If the bit setting of descriptor bits 430 is "zero one" then byte 400 is empty. Processor 330 then writes the data into byte 400 (step 530). Processor 330 then sets the two descriptor bits 430 to "one zero" to signify that byte 400 is now full (step 540). Processor 330 then continues processing data. If the bit setting of descriptor bits 430 is not "zero one" then byte 400 is not empty. Write access is then denied to processor 330 (step 550) and processor 330 continues processing data. Processor 330 may attempt to write data into byte 400 at a later time.

Figure 6:
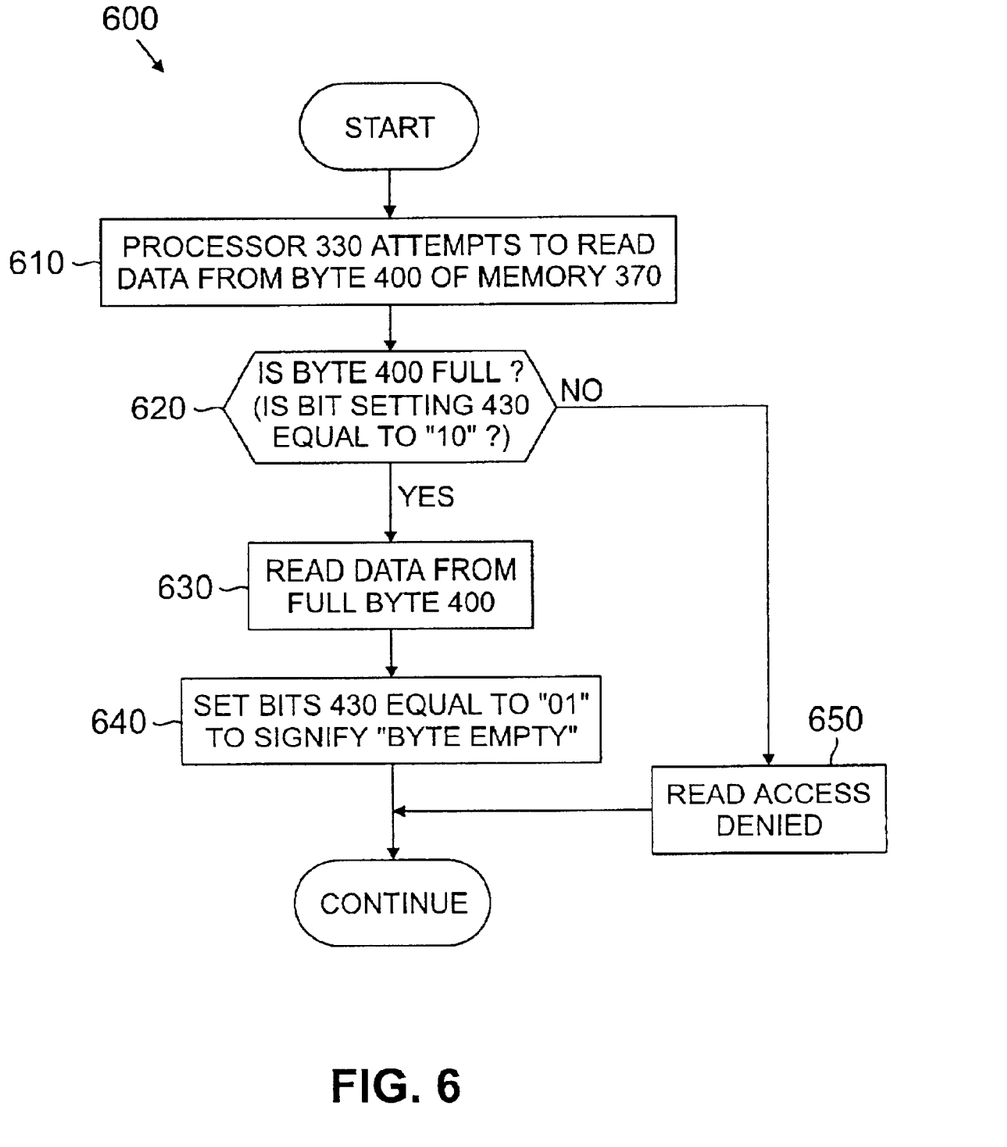
FIG. 6 illustrates a flow chart illustrating the operation of an advantageous embodiment of a method of the present invention for synchronizing the operation of individual processors in a processor array with respect to a read operation.

FIG. 6 illustrates a flow chart illustrating the operation of an advantageous embodiment of a method of the present invention for synchronizing the operation of individual processors in a processor array with respect to a read operation. The steps of the method are collectively referred to with reference numeral 600.

As before, processor 330 is a non-"system" processor. Processor 330 attempts to read data from byte 400 of memory 370 (step 610). Processor 330 checks the two descriptor bits 430 to determine if byte 400 is full (decision step 620). If the bit setting of descriptor bits 430 is "one zero" then byte 400 is full. Processor 330 then reads the data into byte 400 (step 630). Processor 330 then sets the two descriptor bits 430 to "zero one" to signify that byte 400 is now empty (step 640). Processor 330 then continues processing data. If the bit setting of descriptor bits 430 is not "one zero" then byte 400 is not full. Read access is then denied to processor 330 (step 650) and processor 330 continues processing data. Processor 330 may attempt to read data from byte 400 at a later time.

Although the present invention has been described in detail, those skilled in the art should understand that they can make various changes, substitutions and alterations herein without departing from the spirit and scope of the invention in its broadest form.

In particular, although the present invention has been described with reference to an input-output processor of a parallel router system, it is clear that the system and method of the present invention may be used in conjunction with any type of processor array in any type of device that comprises a plurality of processors.

What is claimed is:

1. For use with a processor array comprising a plurality of processors, an apparatus for synchronizing data communications in said processor array, said apparatus comprising:
   an asynchronous variable memory that is accessible by said plurality of processors in said processor array, wherein said asynchronous variable memory comprises at least one memory byte that is capable of regulating memory access to said at least one memory byte.

2. The apparatus as claimed in claim 1 wherein said at least one memory byte in said asynchronous variable memory is a read-full, write-empty memory byte.

3. The apparatus as claimed in claim 2 wherein said at least one memory byte comprises two descriptor bits that signify a status of said at least one memory byte.

4. The apparatus as claimed in claim 3 wherein a bit setting of said two descriptor bits signifies that said at least one memory byte is empty.

5. The apparatus as claimed in claim 3 wherein a bit setting of said two descriptor bits signifies that said at least one memory byte is full.

6. The apparatus as claimed in claim 3 wherein a bit setting of said two descriptor bits signifies that said at least one memory byte is uninitialized.

7. The apparatus as claimed in claim 1 wherein said at least one memory byte of said asynchronous variable memory is accessible by a system processor of said processor array without memory access regulation.

8. The apparatus as claimed in claim 7 wherein said system processor of said processor array is capable of initializing an uninitialized memory byte in said asynchronous variable memory.

9. An input-output processor comprising a processor array comprising a plurality of processors, said input-output processor comprising:
   an asynchronous variable memory for synchronizing data communications in said processor array, wherein said asynchronous variable memory is accessible by said plurality of processors in said processor array, and wherein said asynchronous variable memory comprises at least one memory byte that is capable of regulating memory access to said at least one memory byte.

10. The input-output processor as claimed in claim 9 wherein said at least one memory byte in said asynchronous variable memory is a read-full, write-empty memory byte.

11. The input-output processor as claimed in claim 10 wherein said at least one memory byte comprises two descriptor bits that signify a status of said at least one memory byte.

12. The input-output processor as claimed in claim 11 wherein a bit setting of said two descriptor bits signifies that said at least one memory byte is empty.

13. The input-output processor as claimed in claim 11 wherein a bit setting of said two descriptor bits signifies that said at least one memory byte is full.

14. The input-output processor as claimed in claim 11 wherein a bit setting of said two descriptor bits signifies that said at least one memory byte is uninitialized.

15. The input-output processor as claimed in claim 9 wherein said at least one memory byte of said asynchronous variable memory is accessible by a system processor of said processor array without memory access regulation.

16. The input-output processor as claimed in claim 15 wherein said system processor of said processor array is capable of initializing an uninitialized memory byte in said asynchronous variable memory.

17. For use with a processor array comprising a plurality of processors, a method for synchronizing data communications in said processor array, said method comprising the steps of:

provisioning an asynchronous variable memory that is accessible by said plurality of processors in said processor array; and regulating memory access by at least one processor of said plurality of processors to at least one memory byte in said asynchronous variable memory.

18. The method as claimed in claim 17 wherein said at least one memory byte in said asynchronous variable memory is a read-full, write-empty memory byte.

19. The method as claimed in claim 18 further comprising the step of providing two descriptor bits in said at least one memory byte that signify a status of said at least one memory byte.

20. The method as claimed in claim 19 further comprising the step of providing a bit selling of said two descriptor bits that signifies said at least one memory byte is empty.

21. The method as claimed in claim 19 further comprising the step of providing a bit setting of said two descriptor bits that signifies said at least one memory byte is full.

22. The method as claimed in claim 19 further comprising the step of providing a bit setting of said two descriptor bits that signifies said at least one memory byte is uninitialized.

23. The method as claimed in claim 17 further comprising the step of accessing said at least one memory byte of said asynchronous variable memory with a system processor of said processor array that is not subject to memory access regulation.

* * * * *